(12) United States Patent
Chang et al.

(10) Patent No.: US 8,197,103 B2
(45) Date of Patent: Jun. 12, 2012

(54) DIFFUSION PLATE WITH AT LEAST ONE STAR DIFFUSION STRUCTURE AND A LIGHTING MODULE USING THE SAME

(75) Inventors: Wei-Tien Chang, Hsin-Chu (TW);
Shau-Yu Tsai, Hsin-Chu (TW)

(73) Assignee: AU Optronics Corporation, Hsin-Chu (TW)

(*) Notice: Subject to any disclaimer, the term of this patent is extended or adjusted under 35 U.S.C. 154(b) by 51 days.

(21) Appl. No.: 12/978,703

(22) Filed: Dec. 27, 2010

(65) Prior Publication Data

US 2011/0157889 A1 Jun. 30, 2011

(30) Foreign Application Priority Data

Dec. 31, 2009 (TW) .............................. 98146576 A (51) Int. Cl.
*F21V 5/00* (2006.01)
(52) U.S. Cl. .................... 362/311.02; 362/244; 362/330; 362/333
(58) Field of Classification Search ............. 362/311.02, 362/311.01, 244, 246, 97.3, 326, 329, 330, 362/331, 332, 333
See application file for complete search history.

(56) References Cited

U.S. PATENT DOCUMENTS

| | | | | |
|---|---|---|---|---|
| 3,668,381 A | * | 6/1972 | Schwartz et al. | 362/339 |
| 6,953,264 B2 | * | 10/2005 | Ter-Hovhannisian | 362/241 |
| D563,595 S | * | 3/2008 | Egawa et al. | D26/122 |
| 7,635,193 B2 | * | 12/2009 | Chang | 362/97.3 |
| 2002/0024822 A1 | * | 2/2002 | Pond et al. | 362/555 |
| 2006/0002148 A1 | | 1/2006 | Kim et al. | |
| 2007/0035679 A1 | | 2/2007 | Lee et al. | |
| 2010/0220475 A1 | * | 9/2010 | Park | 362/231 |
| 2010/0246176 A1 | * | 9/2010 | Shyu et al. | 362/235 |

FOREIGN PATENT DOCUMENTS

| | | |
|---|---|---|
| CN | 201166714 Y | 12/2008 |
| JP | 08-129205 A | 5/1996 |
| TW | M264517 | 5/2005 |
| TW | M287952 | 2/2006 |

OTHER PUBLICATIONS

English translation of abstract of TW M264517.
English translation of abstract of TW M287952.
English translation of abstract and pertinent parts of JP 08-129205 A.
English translation of abstract and pertinent parts of CN 201166714 Y.
China Office Action dated May 24, 2011.

* cited by examiner

*Primary Examiner* — Laura Tso
(74) *Attorney, Agent, or Firm* — Thomas, Kayden, Horstemeyer & Risley, LLP (57) ABSTRACT

A diffusion plate for use with a lighting module is provided. The diffusion plate includes a substrate, a plurality of circular diffusion structures, and at least one star diffusion structure. The circular diffusion structures are disposed on one face of the substrate in array. Each circular diffusion structure includes a plurality of first partial reflecting units. The first partial reflecting units are disposed on the substrate in circular distribution. The outer arcs of adjacent circular diffusion structures together form a star region. The at least one star diffusion structure includes a plurality of second partial reflecting units. The second partial reflecting units are disposed in the star region on the face of the substrate, wherein the second partial reflecting units are distributed in star distribution.

27 Claims, 10 Drawing Sheets

DIFFUSION PLATE WITH AT LEAST ONE STAR DIFFUSION STRUCTURE AND A LIGHTING MODULE USING THE SAME

BACKGROUND OF THE INVENTION

1. Field of the Invention

This invention generally relates to a diffusion plate. More particularly, this invention relates to a diffusion plate for use with a lighting module of a liquid crystal display.

2. Description of the Prior Art

Recently, liquid crystal displays are widely used in many display devices such as televisions, computers, laptops, monitors, cell phones, digital cameras, etc. A backlight module provides the liquid crystal display with a uniform light of sufficient brightness, so that the liquid crystal display can display images normally.

Figure 1:
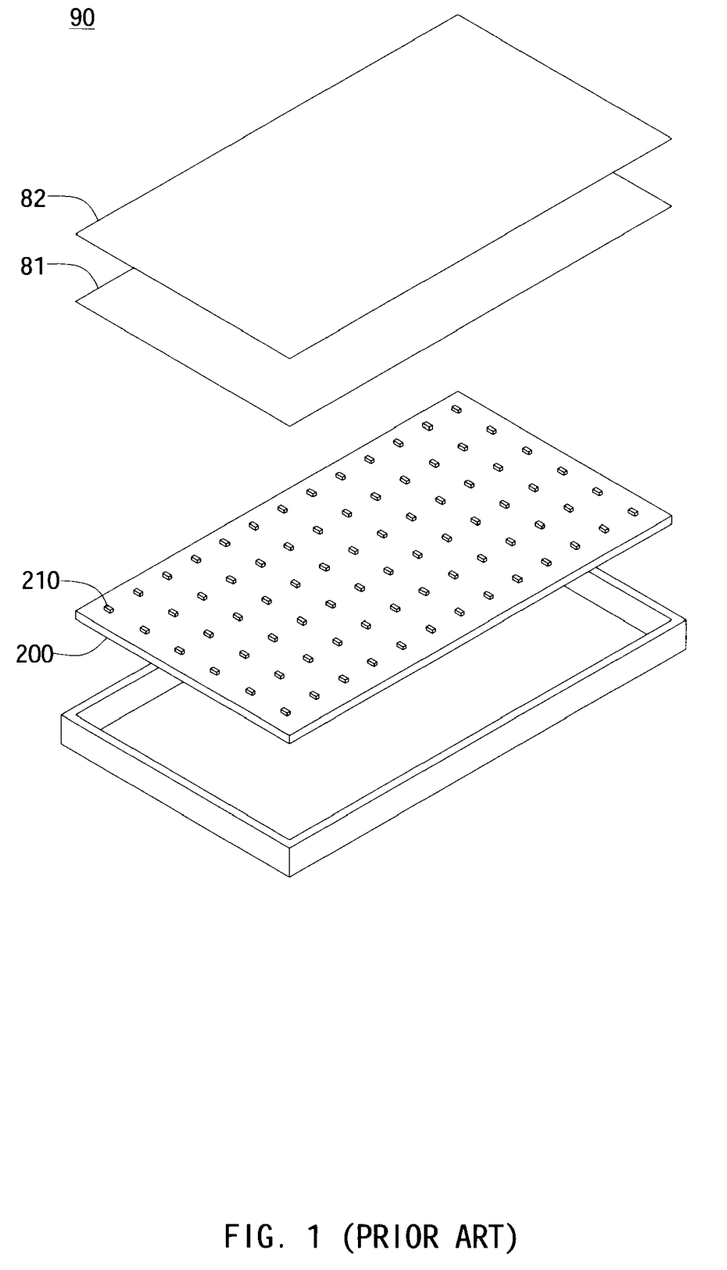
FIG. 1 is a schematic view of a conventional lighting module.

As shown in FIG. 1, a conventional direct lighting-type backlight module 90 includes a light source module 200 and an optical film set 80. The optical film set 80 is a double-layer structure including a first diffusion plate 81 and a second diffusion plate 82, wherein micro-structures are respectively printed on one face of each of the first diffusion plate 81 and the second diffusion plate 82. On the other hand, light emitting diodes (LED) are small in volume and low power consumption. Therefore, light emitting diodes are widely used as the light sources of many electronic devices, including liquid crystal display. However, though a double-layer structure is used, the conventional direct lighting-type backlight module still has insufficient light distribution uniformity. Using double-layer structure or more layers of optical films to maintain certain degree of light distribution uniformity will increase the thickness and the cost of the backlight module. Besides, hundreds of light emitting diodes in general are used in display, such as TV. Therefore, LEDs have a significant contribution to the total cost of the direct lighting-type backlight module.

SUMMARY OF THE INVENTION

It is an object of the present invention to provide a diffusion plate for use with a lighting module to enhance the light distribution uniformity of the lighting module.

It is another object of the present invention to provide a diffusion plate for use with a lighting module to decrease the manufacturing cost of the lighting module.

It is a further object of the present invention to provide a lighting module having improved light distribution uniformity.

It is yet another object of the present invention to provide a lighting module having reduced manufacturing cost.

The diffusion plate of the present invention includes a substrate, a plurality of circular diffusion structures, and at least one star diffusion structure. The circular diffusion structures are disposed on one face of the substrate in array. Each circular diffusion structure includes a plurality of first partial reflecting units. The first partial reflecting units are disposed on the substrate in circular distribution. The outer arcs of adjacent circular diffusion structures together form a star region. The at least one star diffusion structure includes a plurality of second partial reflecting units. The second partial reflecting units are disposed on the same face of the substrate, wherein the second partial reflecting units are distributed in the star region in a star distribution manner.

The substrate has a boundary, wherein the adjacent circular diffusion structures disposed along the boundary form the star region with the boundary. The plurality of first partial reflecting units of each circular diffusion structure around the center of the circular diffusion structure are a plurality of concentric rings distributed radially with respect to the center of the circular diffusion structure. The first partial reflecting unit of each circular diffusion structure at the center of the circular diffusion structure is a solid circle.

The plurality of first partial reflecting units of each circular diffusion structure at and around the center of the circular diffusion structure are a plurality of concentric rings. The width of the plurality of concentric rings decreases as the distance from the center of the circular diffusion structure increases. The spacing of the plurality of concentric rings increases as the distance from the center of the circular diffusion structure increases. Each concentric ring is composed by a plurality of segments, wherein the plurality of segments have spacing between each other.

The plurality of second partial reflecting units are a plurality of star units, wherein each star unit is composed by a plurality of curve lines. The plurality of curve lines are partial outer arcs of adjacent circular diffusion structures. The width of the plurality of star units increases as the distance from the center of the star diffusion structure increases. The spacing of the plurality of star units decreases as the distance from the center of the star diffusion structure increases.

The plurality of first partial reflecting units are solid circles distributed in concentric circles radially from the center of the circular diffusion structure. The diameter of the plurality of first partial reflecting units decreases as the distance from the center of the circular diffusion structure increases. The spacing of the concentric circles formed by the solid circles increases as the distance from the center of the circular diffusion structure increases.

The plurality of second partial reflecting units are dot units, wherein the dot units are distributed in star units, each star unit is composed of a plurality of curve lines. The plurality of curve lines are partial concentric circles of adjacent circular diffusion structures. The diameter of the plurality of second partial reflecting units increases as the distance from the center of the star diffusion structure increases. The spacing of the plurality of star units decreases as the distance from the center of the star diffusion structure increases.

The diffusion plate further includes an additional diffusion unit disposed on the opposite face of the substrate, wherein the additional diffusion unit is a mirror image of the circular diffusion structure and the star diffusion structure. The diffusion plate further includes an additional diffusion unit covering the opposite face of the substrate. The plurality of circular diffusion structures are disposed on the face of the substrate in a square matrix, wherein the outer arcs of four adjacent circular diffusion structures are externally tangent to form the star region. The plurality of circular diffusion structures can be disposed on the face of the substrate in a triangle matrix, wherein the outer arcs of three adjacent circular diffusion structures are externally tangent to form the star region. The lighting module of the present invention includes a light source module and the above diffusion plate. The light source module includes a plurality of light sources.

BRIEF DESCRIPTION OF THE DRAWINGS

FIG. 3B to 5B are schematic views of different embodiments of the present invention.

DETAILED DESCRIPTION OF THE PREFERRED EMBODIMENT

Figure 2A:
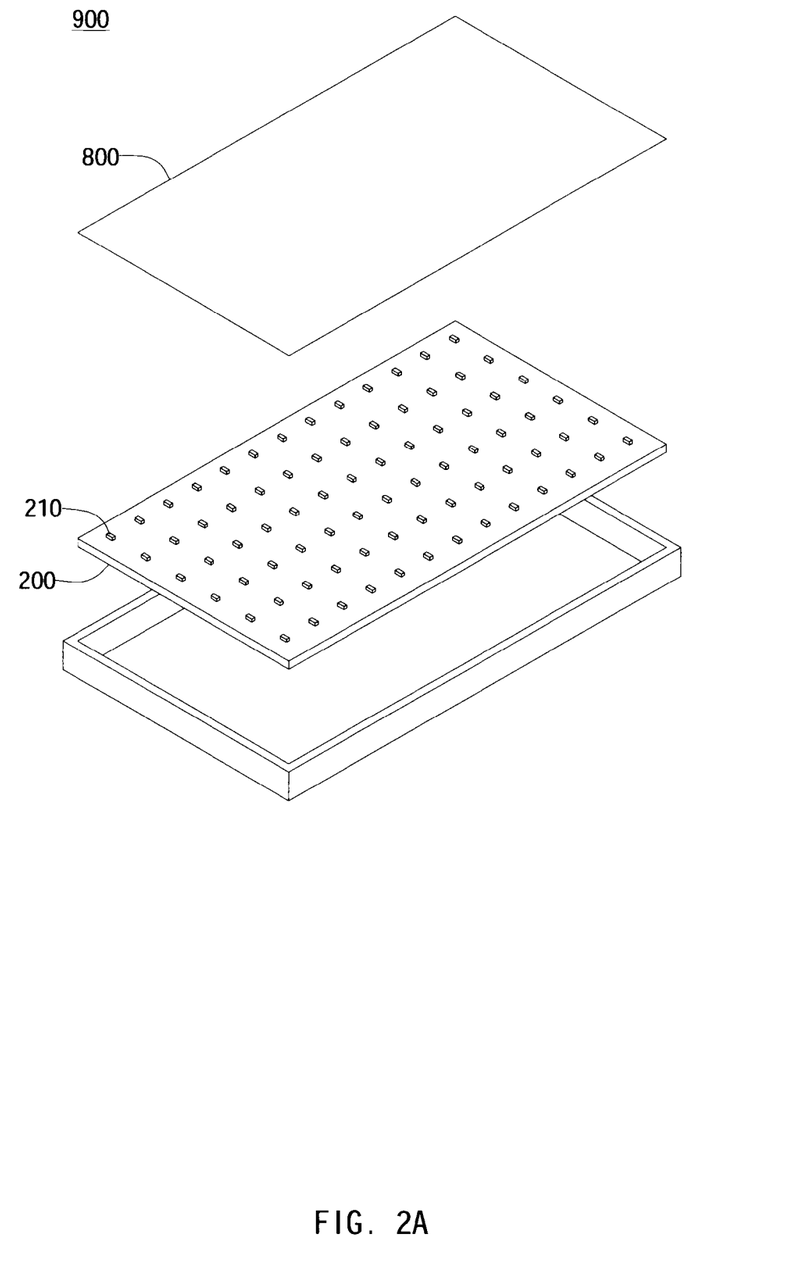
FIG. 2A is an exploded view of the lighting module of the present invention.

As the exploded view of the lighting module of the present invention shown in FIG. 2A, in a preferred embodiment, the diffusion plate 800 of the present invention is for use with the lighting module 900. More particularly, the lighting module 900 includes a light source module 200 and the diffusion plate 800. The light source module 200 includes a plurality of light sources 210, wherein the light source includes a light-emitting diode (LED). As the side view of one embodiment of the present invention shown in FIG. 2B, the diffusion plate 800 of the present invention includes a substrate 100 and a plurality of partial reflecting units 400 disposed on the surface of the substrate 100. Though the partial reflecting units 400 are disposed on the lower surface of the substrate 100 in the embodiment shown in FIG. 2B, the partial reflecting units 400 can also be disposed on the upper surface of the substrate 100 in other embodiments. When the light 600 emitted from the light source 210 reaches the partial reflecting units 400, optical phenomena of partial refraction and partial reflection occur to produce a diffusion effect, increasing the light distribution uniformity of the lighting module. On the other hand, instead of using double-layer structure, the diffusion plate 800 of the present invention uses a single-layer structure, wherein the partial reflecting units 400 are formed on at least one surface of the substrate 100 to reduce the thickness and the cost of the lighting module. The reflectivity of the diffusion plate is between 25% and 100%, preferably between 25% and 80%. The reflectivity of the diffusion plate 800 can be designed higher with the increasing brightness of the light source 210. The reflectivity of the diffusion plate 800 can be modulated by adjusting the density or coverage rate of the partial reflecting units 400 or by selecting appropriate material for the partial reflecting units 400. The manufacturing process of the partial reflecting units 400 is preferably, but not limited to, screen printing, wherein sputtering or inkjet printing are also considered.

Figure 3A:
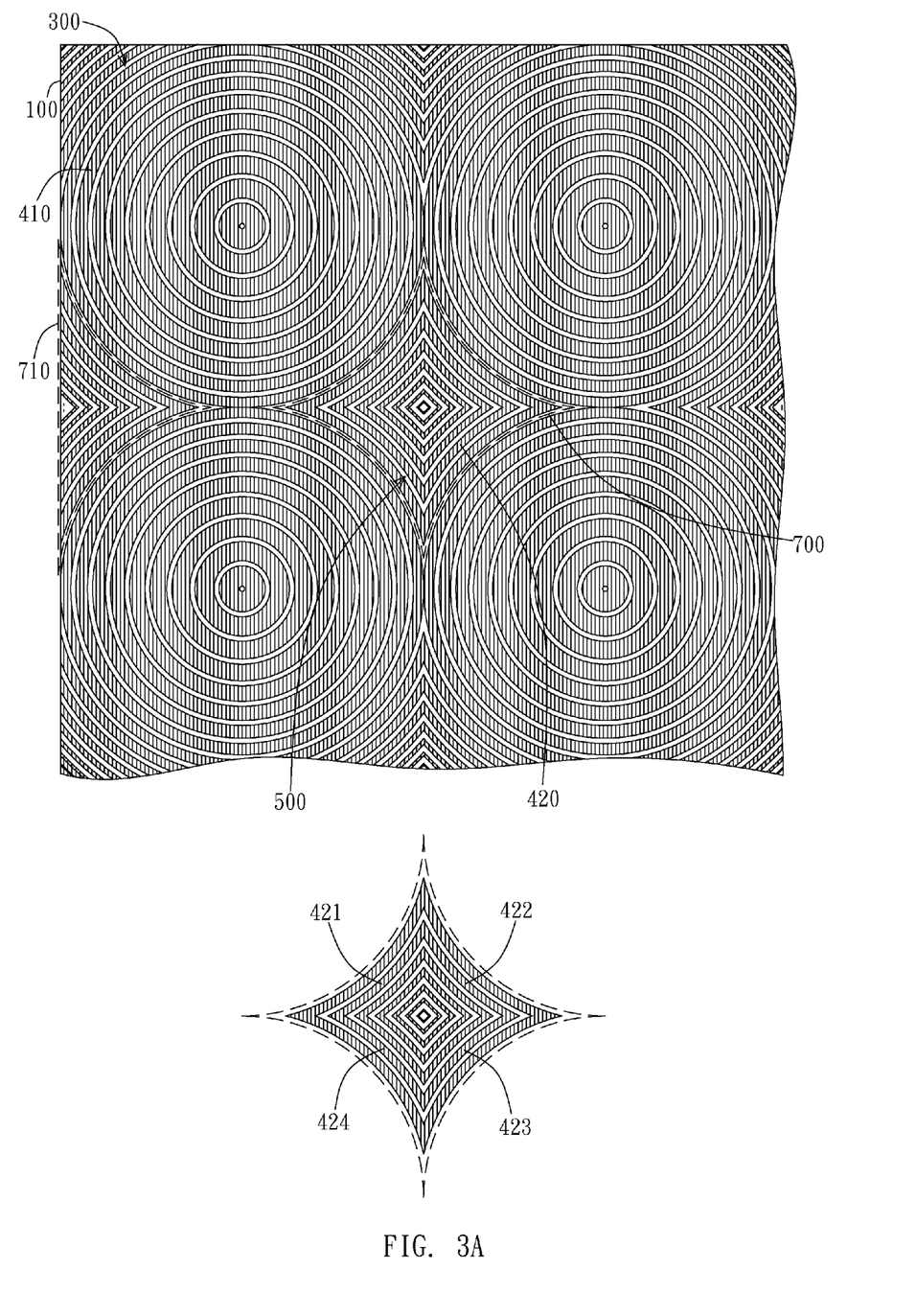
FIG. 3A is a schematic view of a preferred embodiment of the present invention.

The structure of the diffusion plate 800 of the present invention is further illustrated as below. As shown in FIG. 3A, the diffusion plate 800 of the present invention includes a substrate 100, a plurality of circular diffusion structures 300, and at least one star diffusion structure 500. The substrate 100 can be a transparent plate or a diffusion particles-included plate. The circular diffusion structures 300 are disposed on one face of the substrate 100 in array. As the preferred embodiment shown in FIG. 3A, the plurality of circular diffusion structures 300 are disposed on the face of the substrate 100 in a square matrix, wherein the outer arcs of four adjacent circular diffusion structures 300 are externally tangent to form a star region 700 with four rays (i.e. 4-ray star region). In other embodiments, however, the plurality of circular diffusion structures 300 are disposed on the face of the substrate 100 in a triangle matrix, wherein the outer arcs of three adjacent circular diffusion structures 300 are externally tangent to form the star region 700 with three rays (i.e. 3-ray star region).

Each circular diffusion structure 300 includes a plurality of first partial reflecting units 410. The first partial reflecting units 410 are disposed on the substrate 100 in circular distribution. The outer arcs of the adjacent circular diffusion structures 300 together form the star region 700. The at least one star diffusion structure 500 includes a plurality of second partial reflecting units 420. The second partial reflecting units 420 are disposed on the face of the substrate 100, wherein the second partial reflecting units 420 are distributed in the star region 700 in a star distribution manner. The first partial reflecting units 410 and the second partial reflecting units 420 together form the partial reflecting units 400 shown in FIG. 2B. The thickness of the partial reflecting unit 400 is preferably between 1 nm and 1 mm, wherein the material of the partial reflecting unit 400 is preferably $BaCO_3$ or $BaSO_4$ when the thickness of the partial reflecting unit 400 is in micro-scale, and the material of the partial reflecting unit 400 is preferably a thin-film material such as $Ta_2O_5$ or $SiO_2$ when the thickness of the partial reflecting unit 400 is in nano-scale.

Figure 2B:
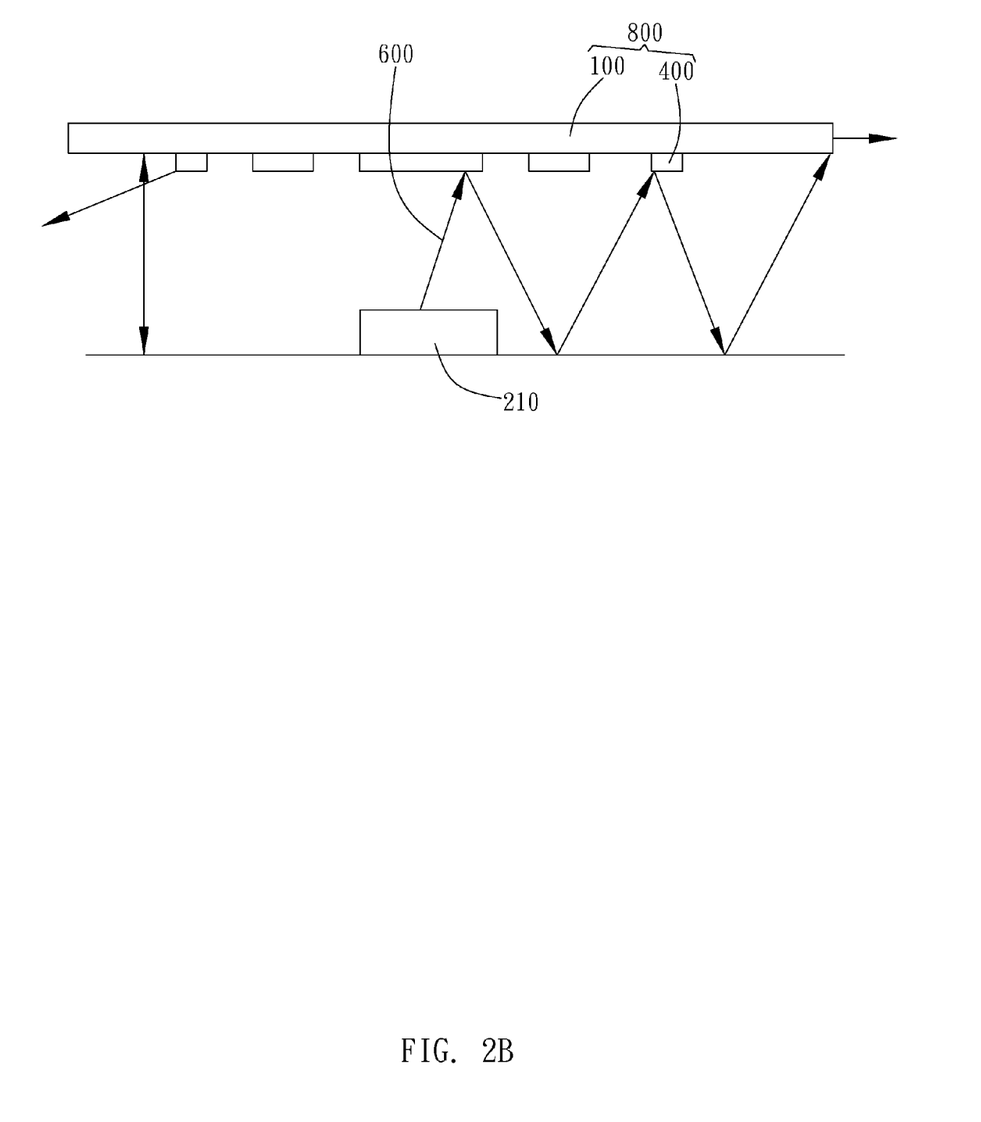
FIG. 2B is a side view of one embodiment of the present invention.

As shown in FIG. 3A, the plurality of second partial reflecting unit 420 are a plurality of star units, wherein each star unit is composed by a plurality of curve lines. The plurality of curve lines are partial outer arcs of the adjacent circular diffusion structures 300. More particularly, the outmost star unit of the second partial reflecting unit 420 is composed by four concentric arcs 421, 422, 423, and 424 closest to the adjacent circular diffusion structures 300. The concentric arc 421 is concentric with the upper left circular diffusion structure 300; the concentric arc 422 is concentric with the upper right circular diffusion structure 300; the concentric arc 423 is concentric with the lower right circular diffusion structure 300; the concentric arc 424 is concentric with the lower left circular diffusion structure 300. Accordingly, other star units of the second partial reflecting unit 420 are composed in a similar manner. As shown in FIG. 2B, the center of each circular diffusion structure 300 preferably individually corresponds to one light source 210. More particularly, the center of each circular diffusion structure 300 is preferably individually disposed above one light source 210.

As shown in FIG. 3A, in other words, a plurality of circle centers are disposed on the surface of the substrate 100 in array. The partial reflecting units are distributed in circular shape and arranged radially with respect to each center, wherein some of the partial reflecting units intersect with each other to enclose the star region 700. The partial reflecting units outside the star region are the first partial reflecting units 410, while the partial reflecting units inside the star region are the second partial reflecting units 420. On the other hand, the substrate 100 has a boundary, wherein the adjacent circular diffusion structures 300 disposed along the boundary form a star region 710 with the boundary.

As shown in FIG. 3A, in a preferred embodiment, the plurality of first partial reflecting units 410 of each circular diffusion structure 300 around the center of the circular diffusion structure 300 are a plurality of concentric rings distributed radially from the center of the circular diffusion structure 300. However, as a different embodiment shown in FIG. 3B, the first partial reflecting unit 410 of each circular diffusion structure 300 at the center of the circular diffusion structure 300 is a solid circle. More particularly, as shown in FIG. 3A, the first partial reflecting units 410 at the center of the circular diffusion structure 300 is also a concentric ring. A partial of light emitted upwardly from the light source 210 (shown in FIG. 2B) passes through the diffusion plate 800 without any reflection by the first partial reflecting units 410. As the different embodiment shown in FIG. 3B, the first partial reflecting units 410 at the center of the circular diffusion structure 300 is a solid circle, wherein all light emitted upwardly from the light source 210 will be partially reflected by the first partial reflecting units 410 when passing through the diffusion plate 800. In other words, the amount of light emitted upwardly from the light source 210 passing through the diffusion plate 800 without reflection can be regulated by adjusting the coverage rate of the pattern at the center of the circular diffusion structure 300.

Figure 3B:
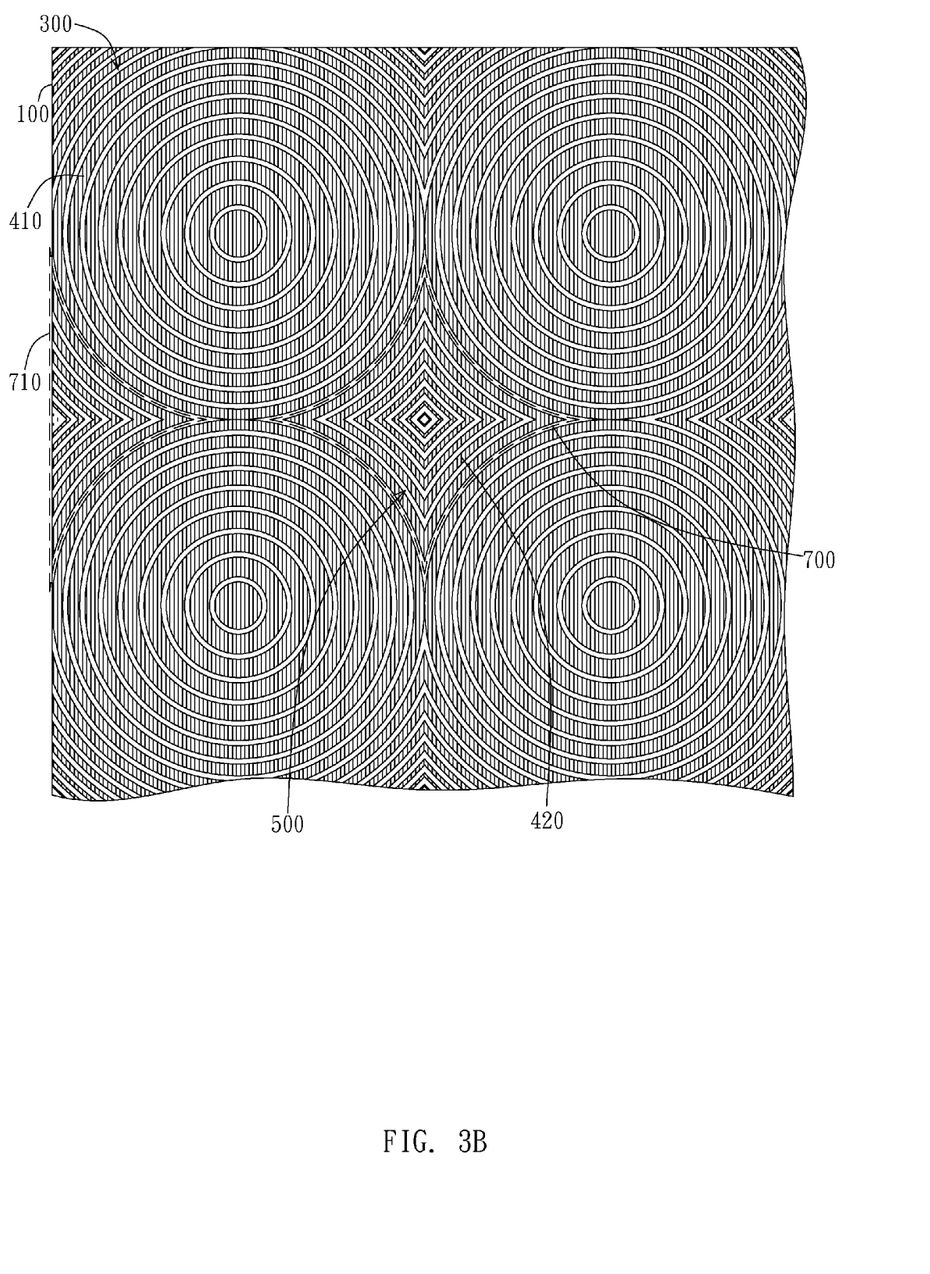

As the embodiments shown in FIGS. 3A and 3B, the plurality of first partial reflecting units 410 of each circular diffusion structure 300 around the center of the circular diffusion structure 300 are a plurality of concentric rings, wherein the width of the plurality of concentric rings decreases as the distance from the center of the circular diffusion structure 300 increases. In other words, the coverage rate of the circular diffusion structure 300 can be regulated by adjusting the widths of the plurality of concentric rings of the first partial reflecting units 410. The width of the plurality of star units of the second partial reflecting units 420 decreases as the distance from the center of the adjacent circular diffusion structure 300 increases, i.e. the width of the plurality of star units of the second partial reflecting units 420 increases as the distance from the center of the star diffusion structure increases.

In other embodiments, the coverage rate of the circular diffusion structures 300 can be regulated by adjusting the spacing of the concentric rings of the first partial reflecting units 410. More particularly, the width of the concentric rings of the first partial reflecting units 410 is determined at first and then the spacing of the concentric rings of the first partial reflecting units 410 is adjusted. The less the spacing is, the higher coverage rate of the first partial reflecting units 410 in a unit area can be. As a different embodiment shown in FIG. 3C, the spacing of the plurality of concentric rings increases as the distance from the center of the circular diffusion structure increases. The spacing of the plurality of star units increases as the distance from the center of the adjacent circular diffusion structure 300 increases, i.e. the spacing of the plurality of star units decreases as the distance from the center of the star diffusion structure increases.

Figure 3C:
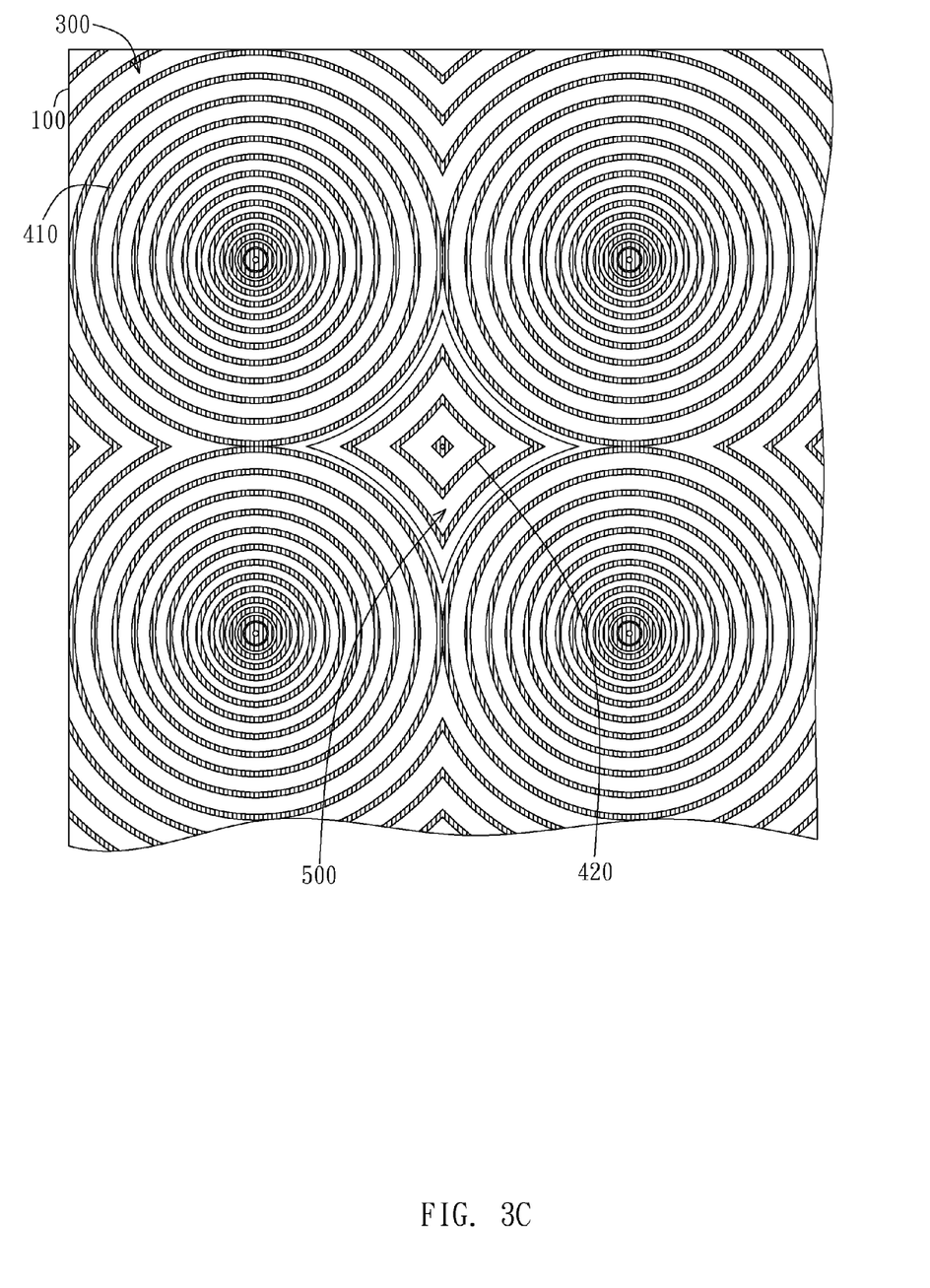
Figure 4:
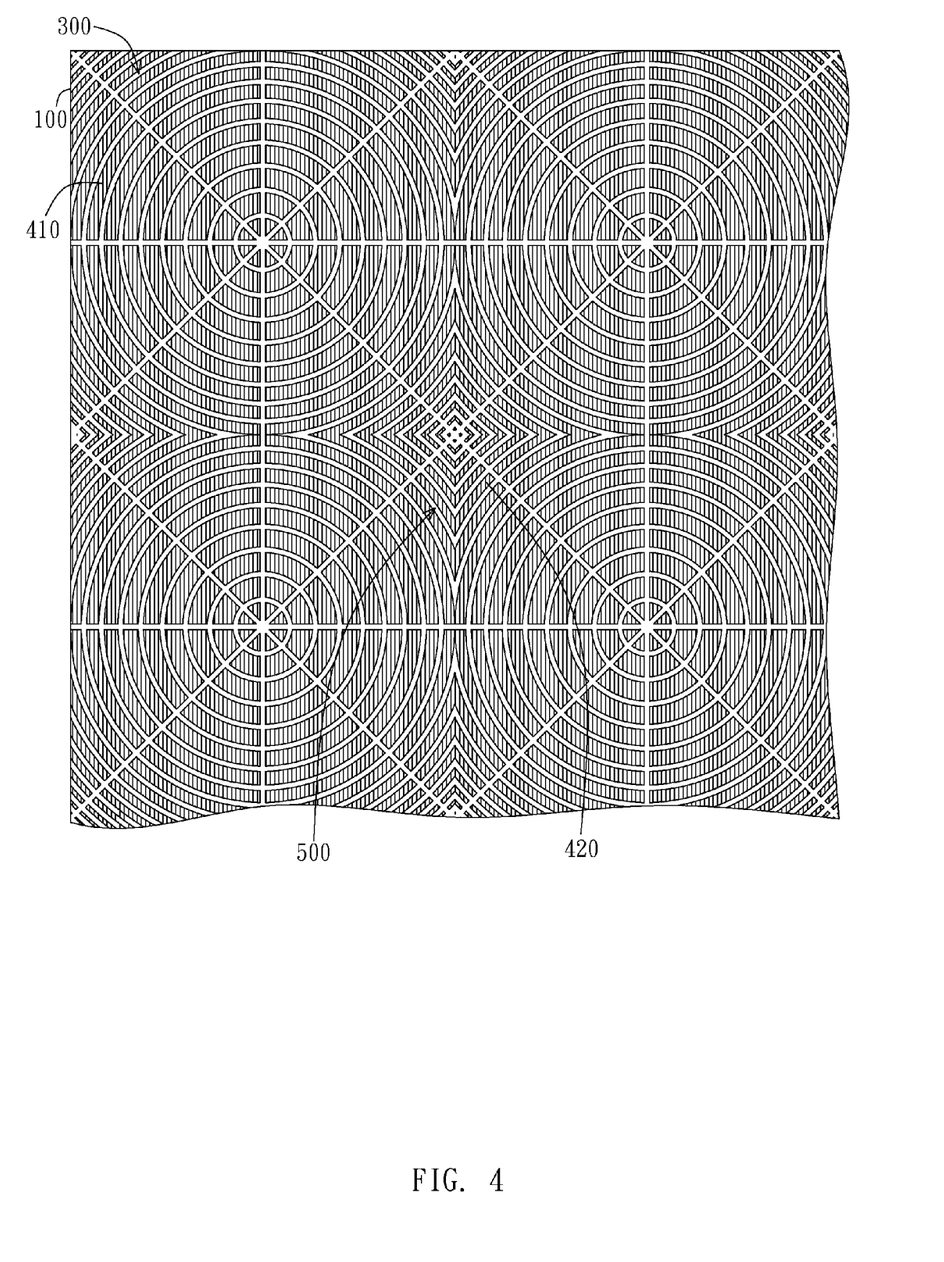
Figure 5A:
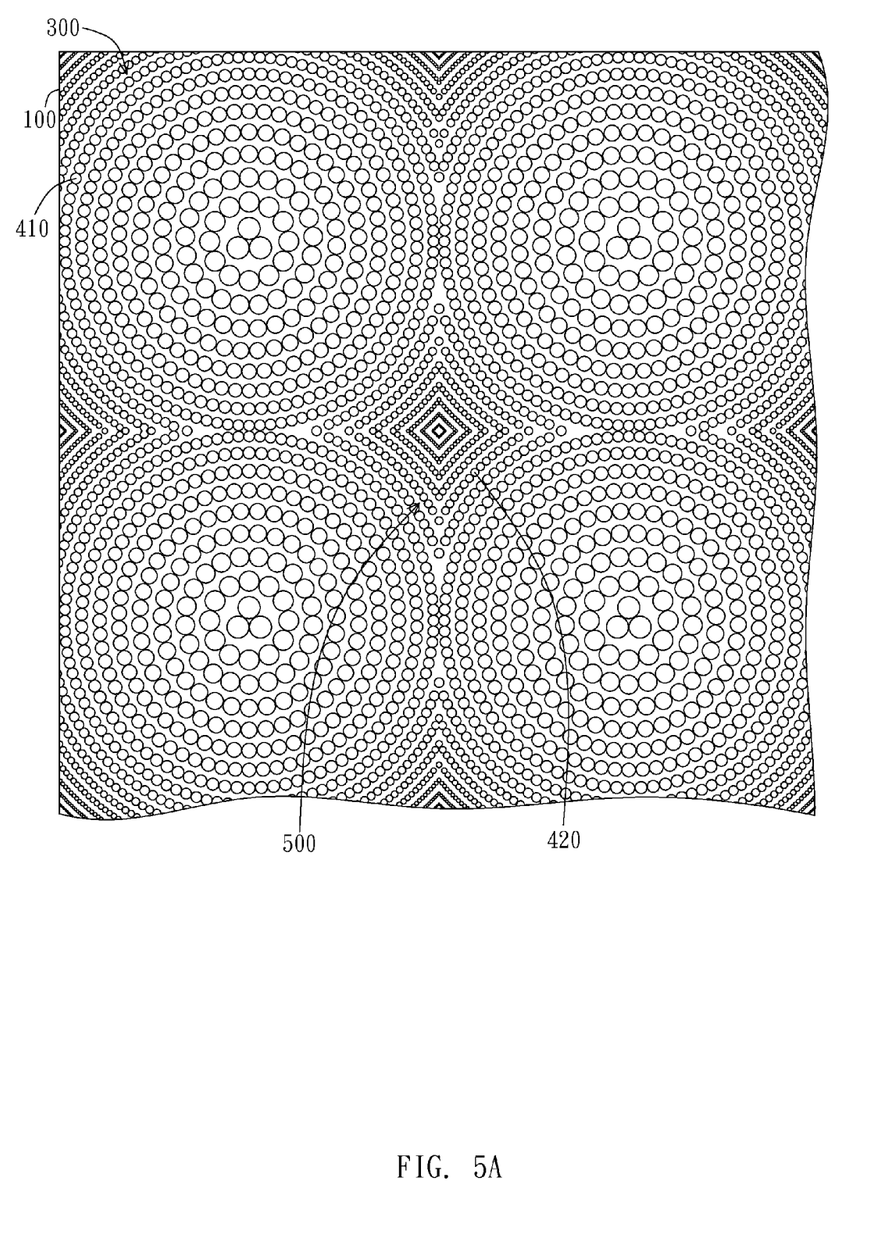
Figure 5B:
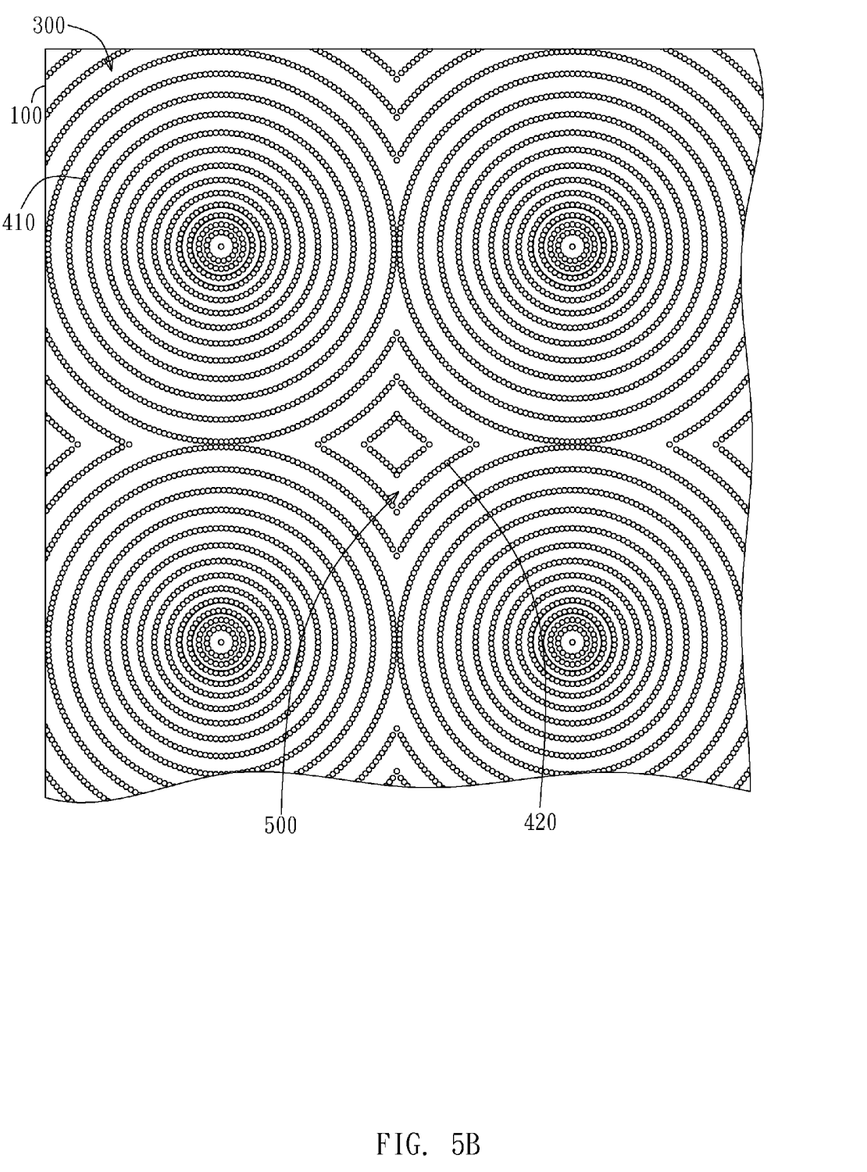

As shown in FIG. 3A to 3C, all concentric rings of the circular diffusion structures 300 are continuous. In other embodiments, however, the concentric ring can be composed by segments or dot units in accordance with design requirements. As the embodiment shown in FIG. 4, each concentric ring is composed by a plurality of segments, wherein the plurality of segments have spacing between each other. As the embodiment shown in FIGS. 5A and 5B, the plurality of first partial reflecting units 410 are solid circles distributed in concentric circles radially form the center of the circular diffusion structure 300. In other words, the first partial reflecting unit 410 are solid circles distributed in concentric circles of different diameters. Corresponding to the first partial reflecting unit 410, the plurality of second partial reflecting units 420 are also dot units distributed in star units, wherein each star unit is composed of a plurality of curve lines constituted by the dot units. As shown in FIG. 5A, the diameter of the plurality of first partial reflecting units 410 decreases as the distance from the center of the circular diffusion structure 300 increases. The diameter of the plurality of second partial reflecting units 420 decreases as the distance from the center of the adjacent circular diffusion structure 300 increases, i.e. the diameter of the plurality of second partial reflecting units 420 increases as the distance from the center of the star diffusion structure increases. On the other hand, as the embodiment shown in FIG. 5B, the spacing of the plurality of concentric circles increases as the distance from the center of the circular diffusion structure 300 increases. The spacing of the plurality of star units increases as the distance from the center of the adjacent circular diffusion structure 300 increases, i.e. the spacing of the plurality of star units decreases as the distance from the center of the star diffusion structure increases.

Figure 6A:
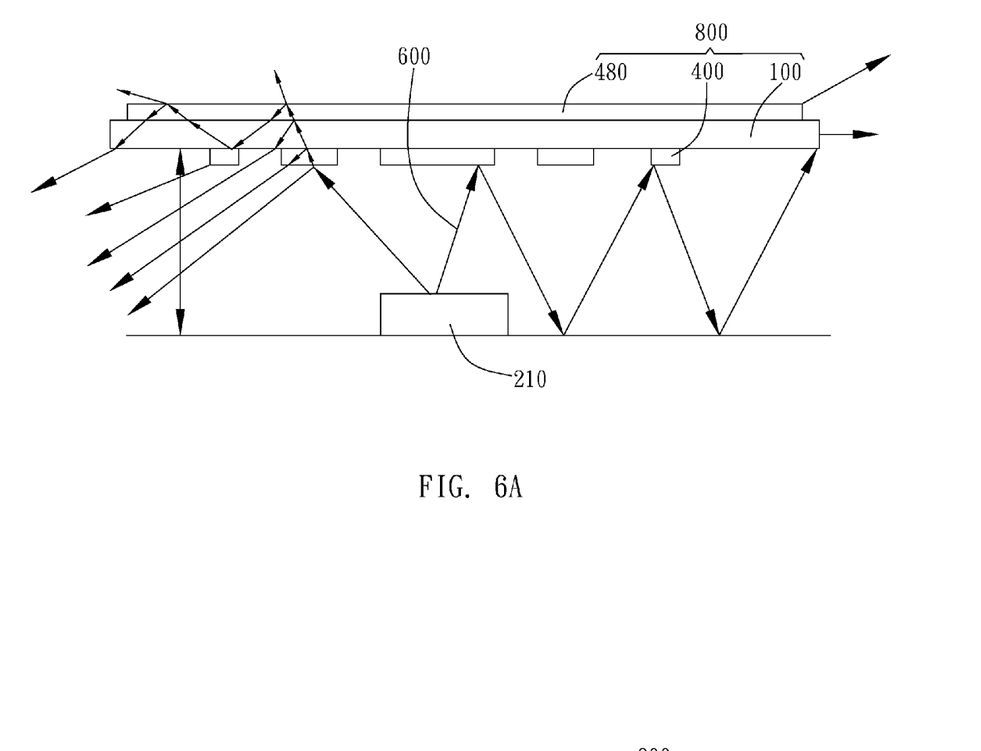
FIGS. 6A and 6B are schematic views of the preferred embodiment of the present invention having diffusion units on opposite sides.
Figure 6B:
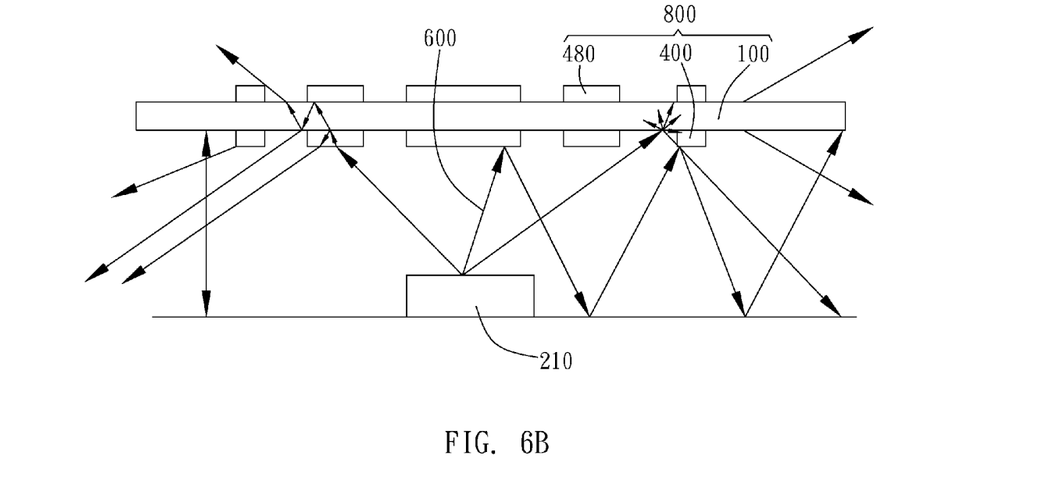

As shown in FIGS. 6A and 6B, in a preferred embodiment, the diffusion plate 800 further includes an additional diffusion unit 480 disposed on the opposite face of the substrate 100 for further increasing the partial reflection of light 600. The reflectivity of the diffusion plate 800 is between 25% and 100%, preferably between 25% and 80%. The reflectivity of the diffusion plate 800 can be designed higher with the increasing brightness of the light source 210. The thickness of the additional diffusion unit 480 is preferably between 1 nm and 1 mm, wherein the material of the additional diffusion unit 480 is preferably $BaCO_3$ or $BaSO_4$ when the thickness of the additional diffusion unit 480 is in micro-scale, and the material of the additional diffusion unit 480 is preferably a thin-film material such as $Ta_2O_5$ or $SiO_2$ when the thickness of the additional diffusion unit 480 is in nano-scale. As the embodiment shown in FIG. 6A, the additional diffusion unit 480 covers the opposite face of the substrate 100. As the embodiment shown in FIG. 6B, the additional diffusion unit 480 disposed on the opposite face of the substrate 100 is a mirror image of the circular diffusion structure (shown in FIG. 3A) and the star diffusion structure (shown in FIG. 3A), wherein the circular diffusion structure and the star diffusion structure together form the partial reflecting units 400 shown in FIG. 6B. As shown in FIGS. 6A and 6B, a partial reflection occurs when light 600 emitted from the light source 210 reaches the partial reflecting units 400, and a further partial reflection occurs when the light 600 reaches the additional diffusion unit 480. More particularly, due to multiple partial reflections by the partial reflecting unit 400 and the additional diffusion unit 480, the light 600 can have a wider distribution. Therefore, the light distribution uniformity of the lighting module can be increased; the use of light source 210 can be decreased; the power consumption and the manufacturing cost can be reduced.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A diffusion plate for use with a lighting module, comprising:
   a substrate;
   a plurality of circular diffusion structures disposed on one face of the substrate in array, each circular diffusion structure including a plurality of first partial reflecting units, the plurality of first partial reflecting units being disposed on the substrate in circular distribution, wherein the outer arcs of the adjacent circular diffusion structures together form a star region; and
   at least one star diffusion structure including a plurality of second partial reflecting units, the second partial reflecting units being disposed in the star region on the face of the substrate and distributed in star distribution.

2. The diffusion plate of claim 1, wherein the substrate has a boundary, the adjacent circular diffusion structures disposed along the boundary form the star region with the boundary.

3. The diffusion plate of claim 1, wherein the plurality of first partial reflecting units of each circular diffusion structure around the center of the circular diffusion structure are a plurality of concentric rings distributed radially from the center of the circular diffusion structure.

4. The diffusion plate of claim 3, wherein the first partial reflecting unit of each circular diffusion structure at the center of the circular diffusion structure is a solid circle.

5. The diffusion plate of claim 3, wherein the plurality of first partial reflecting units of each circular diffusion structure at and around the center of the circular diffusion structure are a plurality of concentric rings.

6. The diffusion plate of claim 3, wherein the width of the plurality of concentric rings decreases as the distance from the center of the circular diffusion structure increases.

7. The diffusion plate of claim 3, wherein the spacing of the plurality of concentric rings increases as the distance from the center of the circular diffusion structure increases.

8. The diffusion plate of claim 3, wherein each concentric ring is composed by a plurality of segments, wherein the plurality of segments have spacing between each other.

9. The diffusion plate of claim 3, wherein the plurality of second partial reflecting units are a plurality of star units, wherein each star unit is composed of a plurality of curve lines, the plurality of curve lines are concentric arcs of the adjacent circular diffusion structures.

10. The diffusion plate of claim 9, wherein the width of the plurality of star units increases as the distance from the center of the star diffusion structure increases.

11. The diffusion plate of claim 9, wherein the spacing of the plurality of star units decreases as the distance from the center of the star diffusion structure increases.

12. The diffusion plate of claim 1, wherein the plurality of first partial reflecting units are solid circles distributed in a plurality of concentric circles radially from the center of the circular diffusion structure.

13. The diffusion plate of claim 12, wherein the diameter of the plurality of first partial reflecting units decreases as the distance from the center of the circular diffusion structure increases.

14. The diffusion plate of claim 12, wherein the spacing of the plurality of concentric circles increases as the distance from the center of the circular diffusion structure increases.

15. The diffusion plate of claim 12, wherein the plurality of second partial reflecting units are dot units, wherein the dot units form a plurality of star units, each star unit is composed by a plurality of curve lines, the plurality of curve lines are concentric arcs of the adjacent circular diffusion structures.

16. The diffusion plate of claim 15, wherein the diameter of the plurality of second partial reflecting units increases as the distance from the center of the star diffusion structure increases.

17. The diffusion plate of claim 15, wherein the spacing of the plurality of star units decreases as the distance from the center of the star diffusion structure increases.

18. The diffusion plate of claim 1, further comprising an additional diffusion unit disposed on an opposite face of the substrate, wherein the additional diffusion unit is a mirror image of the circular diffusion structure and the star diffusion structure.

19. The diffusion plate of claim 1, further comprising an additional diffusion unit covering the opposite face of the substrate.

20. The diffusion plate of claim 1, wherein the plurality of circular diffusion structures are disposed on the face of the substrate in a square matrix, wherein outer arcs of four adjacent circular diffusion structures are externally tangent to form the star region.

21. The diffusion plate of claim 1, wherein the plurality of circular diffusion structures are disposed on the face of the substrate in a triangle matrix, wherein outer arcs of three adjacent circular diffusion structures are externally tangent to form the star region.

22. The diffusion plate of claim 1, wherein the reflectivity of the diffusion plate is between 25% and 100%.

23. The diffusion plate of claim 22, wherein the reflectivity of the diffusion plate is between 25% and 80%.

24. A lighting module, comprising:
a light source module having a plurality of light sources;
a diffusion plate, including:
   a substrate disposed on one side of the light source module;
   a plurality of circular diffusion structures disposed on one face of the substrate in array, wherein the center of each circular diffusion structure is disposed above one of the plurality of light sources, each circular diffusion structure includes a plurality of first partial reflecting units, the plurality of first partial reflecting units are disposed on the substrate in circular distribution, outer arcs of adjacent circular diffusion structures are externally tangent to form a star region; and
   at least one star diffusion structure including a plurality of second partial reflecting units, wherein the second partial reflecting units are disposed in the star region on the face of the substrate and distributed in star distribution.

25. The lighting module of claim 24, wherein the substrate has a boundary, the adjacent circular diffusion structures disposed along the boundary form the star region with the boundary.

26. The lighting module of claim 24, wherein the reflectivity of the diffusion plate is between 25% and 100%.

27. The lighting module of claim 26, wherein the reflectivity of the diffusion plate is between 25% and 80%.

* * * * *